Figure 1:
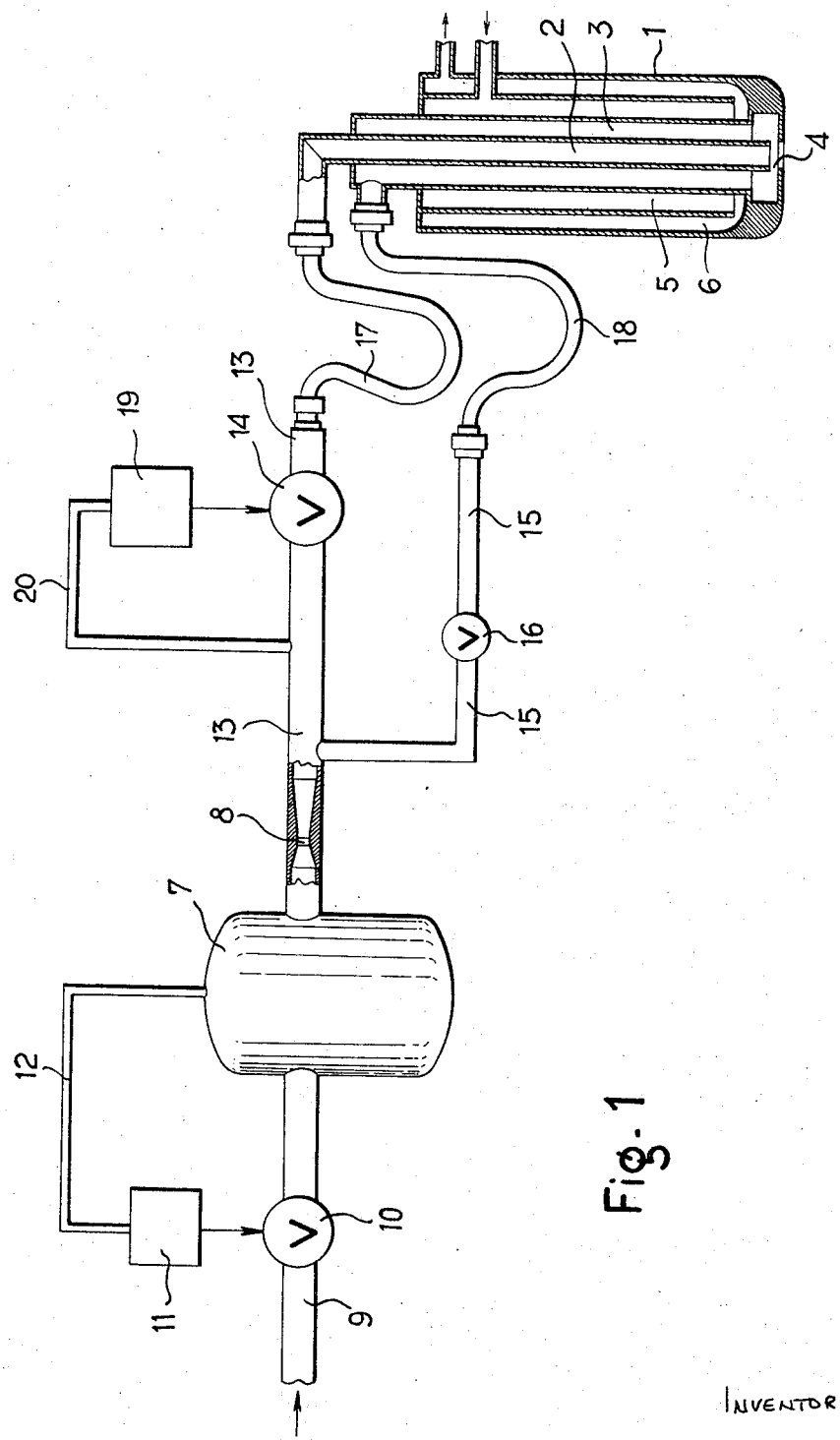

INVENTOR:
ANGEL MARCHETTI

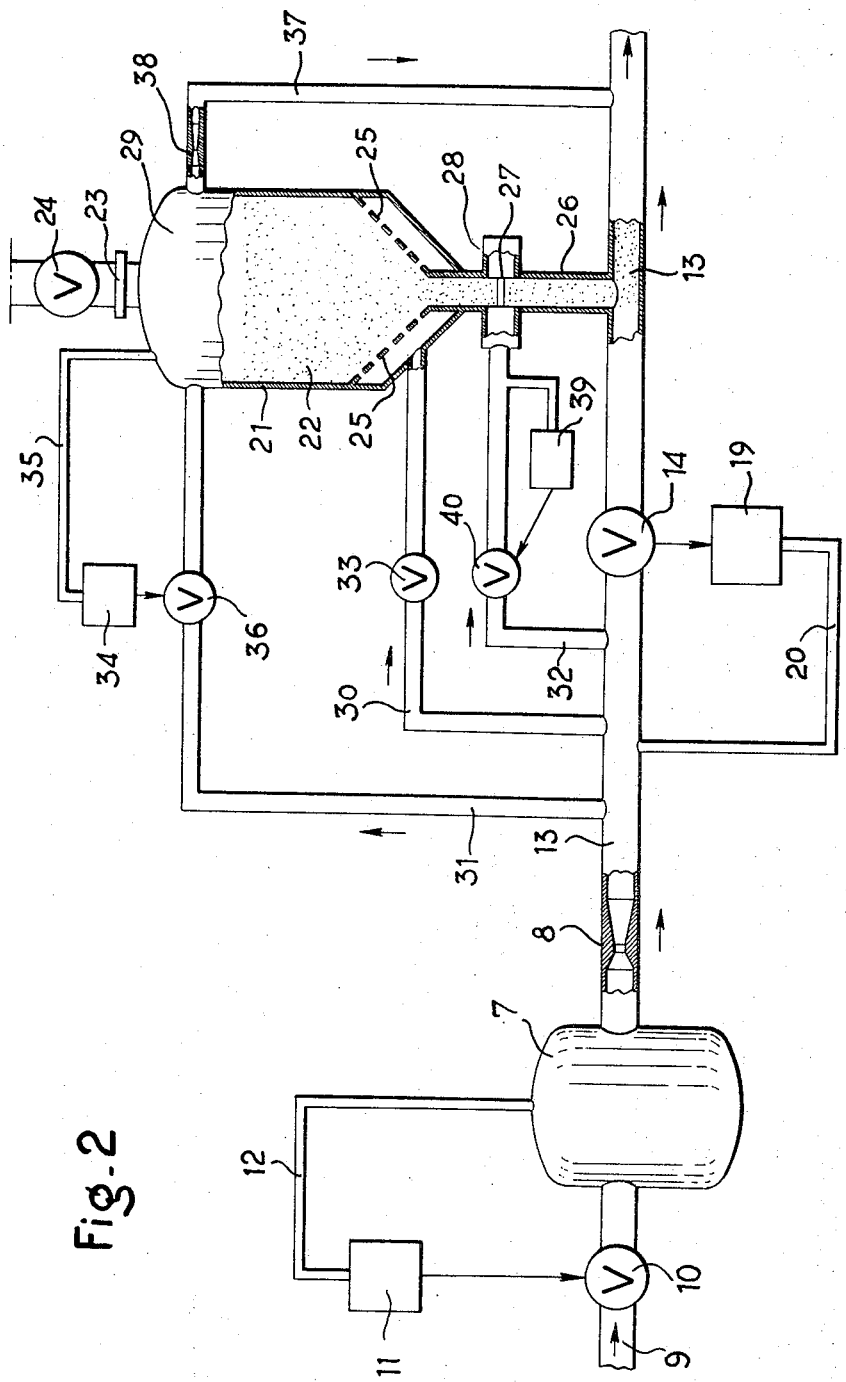

United States Patent Office 3,365,242
Patented Jan. 23, 1968

3,365,242
APPARATUS FOR DISCHARGING A GAS FROM A CONTAINER AT A CONSTANT RATE THROUGH SEVERAL CONDUITS
Angel Marchetti, Metz, France, assignor to Institut de Recherches de la Siderurgie Francaise, Saint-Germain-en-Laye, France
Filed Dec. 8, 1966, Ser. No. 600,094
Claims priority, application France, Dec. 14, 1965, 42,097
2 Claims. (Cl. 302—53)

This invention relates to apparatus for discharging a gas from a container at a constant overall rate through several conduits, and more particularly to apparatus which permits the discharge rate through one of the conduits to be varied without affecting the overall discharge rate.

An object of the invention is the provision of such apparatus in which the overall rate of discharge is held uniform with great precision even if the distribution of gas flow in the several discharge conduits is varied over a wide range.

A more specific object is the provision of apparatus which functions in the manner referred to above even if a solid material is dispersed in the gas flowing in one of the discharge conduits.

With these and other objects in view, as will become apparent hereinafter, the apparatus of the invention includes a container suitable for holding a body of gas at elevated pressure, and equipped with controls for maintaining the body at a constant pressure. The container is connected with a first discharge conduit by a convergent-divergent nozzle for flow of gas from the container through the discharge conduit. At least one second discharge conduit branches from the first-mentioned conduit downstream from the nozzle and is equipped with a valve which permits the gas flow through the second conduit to be controlled.

Downstream from the nozzle is placed a control valve which is operated by a pressure regulator or pressure responsive actuator in such a manner as to keep the gas pressure constant in the discharge conduit between the nozzle and the control valve.

If it is intended to use the gas as a carrier for a powdery solid, the above arrangement is further provided with a tank for delivering said powdery solid under pressure, said tank having at its lower portion an outlet connected to the first discharge conduit and being provided with at least one inlet for gas under pressure to adjust the rate of flow of said powdery solid. The introduction of the powdery solid into the first discharge conduit is located downstream from the control valve and the second discharge conduit branched from the first conduit downstream from the nozzle is connected to the gas inlet of the tank, the regulator of the rate of flow of this second discharge conduit being used to adjust the rate of flow of the powdery solid introduced into the first conduit.

As it may be understood, it is intended to obtain an overall rate of discharge adjusted with a great accuracy in spite of important variations in the operation particularly when the arrangement is used for fluidizing and carrying pulverulent material acting in a chemical reaction. When the carrying gas is also acting in the chemical reaction, as it is the case for instance, when refining pig iron by blowing oxygen carrying pulverulent material, certain methods require a rate of flow adjusted with a great accuracy. It has been observed in such cases that the conventional regulators for the rate of flow do not always enable to obtain the necessary accuracy.

Owing to the invention, the regulation of the rate of flow is changed to a regulation of pressure, which may be obtained with a very great accuracy. When using a tank containing a certain amount of gas, the pressure of which is regulated with a very great accuracy, the required constant rate of flow is obtained through a convergent-divergent nozzle the throat of which is operating at sonic speed. In such a nozzle, the rate of flow at the outlet is dependent only from the pressure upstream with respect to the nozzle, from the temperature of the gas and the cross-section area of the throat. Said rate of flow is not dependent from the pressure downstream from the nozzle as long as the velocity at the throat is the sonic velocity. Consequently, for a nozzle having predetermined dimensions, the rate of flow is adjusted by means of the pressure in the tank, in limits dependent from the possibilities of the equipment for the superior limit and from the necessity of keeping the sonic operation for the inferior limits. The dimensions of the nozzle should be determined according to the range of rates of flow which is required and to the pressure which the equipment may stand, by computations which are well known in the art.

Other features, additional objects, and many of the attendant advantages of this invention will be readily appreciated as the same becomes better understood by reference to the following detailed description of preferred embodiments when considered in connection with the accompanying drawing in which:

FIG. 1 shows a lance with two oxygen flows, for the refining of steel in side elevation, and partly in section; and FIG. 2 illustrates apparatus for supplying powdered reagents together with oxygen to a steel refining vessel, the view being in elevation and partly in section.

Referring now to the drawing in detail, and initially to FIG. 1, there is seen a conventional oxygen lance 1 equipped with a central, straight oxygen discharge tube 2 and a peripheral, annular oxygen conduit 3 coaxial with the tube 2. A narrow circular gap 4 in the conduit 3 discharges oxygen in a radially inward direction into the stream of gas discharged from the orifice of the tube 2. Two serially arranged, coaxial jackets 5, 6 are normally supplied with a stream of cooling water, as indicated by arrows.

It is frequently necessary during the refining of steel by means of elementary oxygen that the rate of oxygen supply be kept precisely constant. Yet, it may simultaneously be necessary to vary the amount of oxygen discharged through the gap 4 and thereby to control the spread of the discharged oxygen stream in a known manner.

The invention is more specifically concerned with apparatus for supplying the lance 1 with oxygen at a rate which remains constant regardless of the distribution of the oxygen between the tube 2 and the conduit 3, which may vary greatly.

In the embodiment of the invention shown in FIG. 1, the apparatus includes a substantially closed container 7 in which a supply of oxygen is stored at uniform pressure. Oxygen is withdrawn from the tank 7 at a constant rate by a convergent-divergent nozzle 8 dimensioned so as to operate in the sonic range. It is well established that the flow rate through such a nozzle is a function only of the pressure at the high-pressure end of the nozzle and of the temperature if the gas flowing through the nozzle reaches the velocity of sound in the throat between the convergent and divergent nozzle parts.

The convergent-divergent nozzle 8 can be replaced by a simple orifice plate dimensioned to produce gas flow of sonic velocity in its orifice under the prevailing conditions, but the pressure loss in the orifice is too great to make an orifice plate practical. Furthermore the convergent-divergent nozzle has the advantage that in its divergent portion the greatest part of the pressure loss is recovered.

For the purpose of the apparatus shown in FIG. 1, the variations in ambient temperature do not significantly affect the flow rate. If more precise compensation for temperature variation is required, the pressure maintained in the container 7 may be varied in response to temperature in a known manner. As long as the temperature and pressure of the gas in the container 7 are constant, the flow rate through the nozzle 8 is constant, regardless of conditions on the downstream side of the nozzle 8.

The container 7 is connected with a source of oxygen at a pressure higher than that prevailing in the container 7 by a supply conduit 9 equipped with a valve 10 which is operated by a conventional pressure-responsive actuator 11 connected to the tank 7 by a sensing conduit 12. The actuator 11 opens and closes the valve 10 as needed to maintain a constant pressure in the tank 7, which may be set in the actuator 11 in a known manner.

The discharge end of the nozzle 8 is connected to a main oxygen discharge line 13 equipped with a butterfly valve 14 the purpose of which will presently become apparent. A branch discharge line 15 communicates with a portion of the main line 13 between the nozzle 8 and the valve 14, and is equipped with a manually controlled valve 16. The discharge lines 13, 15 are respectively connected with the tube 2 and the conduit 3 by flexible tubes 17, 18 which permit the lance 1 to be moved about as needed.

The pressure drop in the conduit constituted by the main discharge line 13, the flexible tube 17, and the central tube 2 of the lance 1 is automatically adjusted for the necessary flow rate by a pressure responsive valve actuator 19 which is connected with the portion of the line 13 immediately upstream from the valve 14 by a sensing conduit 20, and operates the valve 14. Thus the pressure in line 13 between the nozzle 8 and the valve 14 is kept constant.

This arrangement permits control of the distribution of the oxygen stream between the lines 13 and 15 by merely operating the manual control valve 16. The portion of the oxygen stream flowing through the main discharge line 13 can be held at will between 100% and about 20%, the remainder of the gas being discharged through the line 15, whereby the oxygen discharged by the lance 1 may be shaped to form either a narrow, concentrated, strongly penetrating jet, or a broadly spreading stream low in kinetic energy and without penetrating power.

It will be appreciated that the valve 16 need not be operated directly but may be remotely controlled in any desired manner to vary the distribution of the oxygen stream between the lines 13, 15 without changing the overall discharge rate.

The apparatus illustrated in FIG. 2 is intended for delivering reagents in powder form to a body of molten steel in a non-illustrated converter together with the oxygen employed for refining the steel. The apparatus of FIG. 2 has basic features in common with the oxygen supply system of FIG. 1, a container 7 being supplied with oxygen by a high pressure supply line 9 equipped with a valve 10 operated by an actuator 11 to maintain the pressure in the container 7 at a constant value sensed by the actuator through a conduit 12.

A convergent-divergent nozzle 8 delivers a constant stream of oxygen to a main discharge line 13 equipped with a butterfly valve 14 and its actuator 19 which senses the pressure in the line 13 upstream from the valve 14 through a conduit 20 as described above.

A substantially closed cylindrical tank 21 having a conical bottom holds a supply of powdered refining agent 22, such as burnt lime, which may be replenished as needed through a feed nipple 23 at the top of the tank 21 and a normally closed diaphragm valve 24 which connects the nipple to a storage container, not shown.

The powder 22 is held in fluidized condition in the tank 21 by oxygen which flows upwardly through perforations in a false conical bottom 25. The fluidized material flows downwardly from the bottom of the tank 21 through a vertical discharge tube 26 which leads into a portion of the main oxygen discharge line 13 downstream from the valve 14. The tube 26 has a narrow, annular, circumferential slot 27 which communicates with an annular chamber 28 surrounding the tube 26. Flow of oxygen from the chamber 28 inwardly of the tube 26 through the slot 27 precisely controls the discharge rate of the powder 22 from the tank 21 in a known manner. The rate of powder flow in the tube 26 is more coarsely controlled by adjusting the pressure in the gas space 29 above the powder 22 in the tank 21.

The oxygen employed for fluidizing the powder 21, and for controlling its discharge rate is drawn from the main line 13 by three branch lines 30, 31, 32 which communicate with the portion of the main line 13 upstream from the valve 14. The amount of oxygen employed for fluidizing the powder is not critical. It is controlled manually by a valve 33 in the conduit 30 which leads to a portion of the tank 21 under the perforated false bottom 25.

The pressure in the gas space 29 is held constant by means of a valve 36 in the second branch line 31 whose actuator 34 is pressure responsive and is connected to the gas space 29 by a sensing conduit 35. The discharge rate of the powder 22 may be adjusted by setting the actuator 34 to a desired pressure. A bleeder pipe 37 equipped with a throttling restriction 38 connects the gas space 29 with a portion of the main line 13 downstream from the valve 14 and the tube 26 to improve the uniformity of the powder discharge rate as controlled by the valve 36.

The fine control of powder discharge is brought about by a valve 40 in the branch line 32 which connects the main line 13 with the annular chamber 28. It is operated by a pressure responsive actuator 39 which senses the pressure in or near the chamber 28, and holds it at a constant value by more or less opening the valve 40. If the discharge rate of powder through the pipe 26 is monitored for example, by a weighing apparatus (not shown) which delivers an electrical or pneumatic signal in response to excessive or insufficient flow of powder, the signal may be employed instead of pressure monitored through the illustrated sensing conduit of the actuator 39 for controlling the latter in a known manner.

All the oxygen drawn from the main line 13 by the branch lines 30, 31, 32 is ultimately returned to the main line 13 either through the discharge tube 26 or through the bleeder pipe 37. As in the apparatus shown in FIG. 1 the valve actuator 19 controls the pressure drop in the main discharge line 13 in such a manner that the pressure between the convergent-diveregnt nozzle 8 and the valve 14 is held constant.

It is a common feature of the two illustrated embodiments that the flow rate of oxygen through the branch lines may be adjusted by an operator or automatically to produce desired effects whereas the valve 14 adjusts itself automatically for the remaining flow. The overall flow rate of oxygen through the apparatus remains constant and is determined by the nozzle 8.

Typically, the apparatus shown in FIG. 2 may be operated under the following conditions:

For an overall oxygen output between 7.7 and 11.5 m.$^3$/min., as measured under standard conditions of temperature and pressure, the pressure in the container 7 is set to corresponding values between 9 and 14 kg./cm.$^2$ (gage pressure). The pressure downstream from the nozzle 8 is held at 8 kg./cm.$^2$. The gas stream for fluidization and for providing top pressure in the gas space 29 require about 1.5 m.$^3$/min., and the gas discharged into the pipe 26 through the slot 27 may amount to 1.5 and 3 m.$^3$/min., depending on the discharge rate of the powdered lime.

As far as applicable to the apparatus of FIG. 1, the numerical values indicated above are also characteristic of the first-described lance control device. The overall oxygen flow rate in both devices of the invention may be selected at will by setting the pressure in the container 7 within the limits determined by the need for keeping gas flow through the nozzle 8 at sonic velocity.

As long as the flow rate in one of the several discharge conduits downstream from the nozzle 8 is controlled to maintain a constant pressure on the downstream side of the nozzle, the flow rates in each of the other discharge conduits may be selected as needed within the obvious limits set by the requirement to maintain some flow through the pressure-controlled conduit.

While the invention has been described in its specific application to problems relating to the refining of steel by means of oxygen, other applications will readily against themselves to those skilled in the art.

It should be understood, therefore, that the foregoing disclosure relates only to preferred embodiments of the invention, and that numerous modifications and alterations may be made therein, without departing from the spirit and scope of the invention as set forth in the appended claims.

What is claimed is:

1. An apparatus for discharging a gas from a container through a plurality of discharge conduits at a constant combined rate while varying the gas flow in one of said conduits comprising, in combination:
   (a) A container;
   (b) First pressure control means for maintaining a body of gas in said container at a constant pressure;
   (c) A first discharge conduit;
   (d) A convergent-divergent nozzle connecting said container with said first conduit for flow of gas from said container through said conduit;
   (e) A second discharge conduit branching from said first conduit downstream from said nozzle;
   (f) Valve means in said second conduit for controlling gas flow therethrough;
   (g) Control valve means in said first conduit downstream from said nozzle; and
   (h) Pressure responsive valve actuator means operating said valve means in response to gas pressure in said first conduit for keeping said gas pressure at a constant value.

2. An apparatus as set forth in claim 1, further comprising:
   (i) A tank having a top portion and a bottom portion;
   (j) A tube extending downward from said bottom portion and connecting said tank to said first conduit downstream from said control valve means;
   (k) Said second discharge conduit connecting said first conduit to said top portion of said tank;
   (l) Gas-operated discharge control means for controlling downward flow of a powdery material from said tank to said first conduit through said tube; and
   (m) A third discharge conduit branching from said first conduit and connected to said discharge control means for operation of the latter by said gas, said discharge control means communication with said first conduit.

References Cited
UNITED STATES PATENTS

| | | | |
|---|---|---|---|
| 2,770,584 | 11/1956 | Ray et al. | 302—53 |
| 2,957,727 | 10/1960 | Allen et al. | 302—17 |
| 3,159,431 | 12/1964 | Drew | 302—35 |

ANDRES H. NIELSEN, *Primary Examiner.*